US012469651B2

(12) United States Patent
Huang et al.

(10) Patent No.: US 12,469,651 B2
(45) Date of Patent: Nov. 11, 2025

(54) KEYSWITCH STRUCTURE

(71) Applicant: Darfon Electronics Corp., Taoyuan (TW)

(72) Inventors: Yu-Ming Huang, Taoyuan (TW); Chin-Hung Lin, Taoyuan (TW)

(73) Assignee: DARFON ELECTRONICS CORP., Taoyuan (TW)

(*) Notice: Subject to any disclaimer, the term of this patent is extended or adjusted under 35 U.S.C. 154(b) by 205 days.

(21) Appl. No.: 18/473,359

(22) Filed: Sep. 25, 2023

(65) Prior Publication Data

US 2024/0120157 A1 Apr. 11, 2024

(30) Foreign Application Priority Data

Oct. 5, 2022 (TW) ................................ 111137906

(51) Int. Cl.

| | |
|---|---|
| ***H01H 3/12*** | (2006.01) |
| ***H01H 13/10*** | (2006.01) |
| ***H01H 13/704*** | (2006.01) |

(52) U.S. Cl.

CPC ............ *H01H 3/122* (2013.01); *H01H 13/10* (2013.01); *H01H 13/704* (2013.01); *H01H 2221/062* (2013.01)

(58) Field of Classification Search

CPC ......... H01H 2221/062; H01H 2003/00; H01H 2003/12; H01H 2009/0278; H01H 2013/00; H01H 2013/02; H01H 2013/04; H01H 2013/50; H01H 2013/52; H01H 2215/004; H01H 2215/008; H01H 2235/004; H01H 13/00; H01H 13/10; H01H 13/14; H01H 13/20; H01H 13/26; H01H 13/28; H01H 13/50; H01H 13/52; H01H 13/70;

(Continued)

(56) References Cited

U.S. PATENT DOCUMENTS 8,492,669 B2 * 7/2013 Yen ....................... H01H 3/122
200/344
9,837,220 B2 12/2017 Hou et al.
(Continued)

FOREIGN PATENT DOCUMENTS

CN 1275784 A 12/2000
CN 202940152 U 5/2013
(Continued)

OTHER PUBLICATIONS

TW Office Action dated Oct. 26, 2023 in Taiwan application No. 111137906.

*Primary Examiner* — Anthony R Jimenez

(74) *Attorney, Agent, or Firm* — McClure, Qualey & Rodack, LLP

(57) ABSTRACT

A keyswitch structure includes a baseplate, a keycap disposed over the baseplate and configured to be movable relative to the baseplate, a membrane switch disposed between the keycap and the baseplate and configured to have one or more buffer portions with two open edges opposite to each other, and a first linking bar connected to the keycap and disposed between the keycap and the membrane switch. The first linking bar has a first long side and a first short side connected to each other. When the keycap moves relative to the baseplate, the one or more buffer portions provide buffer to the first short side and/or an end section of the first long side.

20 Claims, 6 Drawing Sheets

(58) Field of Classification Search
CPC .. H01H 13/702; H01H 13/703; H01H 13/704; H01H 13/705; H01H 13/7065; H01H 3/00; H01H 3/02; H01H 3/04; H01H 3/06; H01H 3/12; H01H 3/122; H01H 3/125; H01H 3/32; H01H 3/46; H01H 3/60; H01H 2221/00; H01H 2221/05; H01H 2221/058; G05G 1/00; G05G 1/02
USPC .................................................. 200/341, 530
See application file for complete search history.

(56) References Cited

U.S. PATENT DOCUMENTS

| | | | |
|---|---|---|---|
| 10,332,695 | B2 | 6/2019 | Liao et al. |
| 11,600,455 | B2 | 3/2023 | Hou et al. |
| 2016/0284484 | A1 | 9/2016 | Liao et al. |
| 2018/0025859 | A1 | 1/2018 | Chen |
| 2019/0122837 | A1 | 4/2019 | Yang et al. |

FOREIGN PATENT DOCUMENTS

| | | | |
|---|---|---|---|
| CN | 104882318 | A | 9/2015 |
| CN | 109859964 | A | 6/2019 |
| TW | 201805978 | A | 2/2018 |
| TW | 1751030 | B | 12/2021 |

* cited by examiner

KEYSWITCH STRUCTURE

BACKGROUND OF THE INVENTION

1. Field of the Invention

The invention generally relates to a keyswitch structure. Particularly, the invention relates to a keyswitch structure of low noise design.

2. Description of the Prior Art

The keycaps of larger-sized keys of keyboard (such as Space key, Enter key, Caps Lock key, Shift key) have a larger aspect ratio, so one or more linking bars are usually used to enhance the structural strength of such keycaps. However, when the user presses the keycap on the non-center portion (such as end portions), and the pressing force is larger than the supporting force of the linking bar(s), the linking bar is readily deformed and hits the underlying keyswitch component (such as baseplate, casing) to generate noisy sound, impairing the operation smoothness and comfortability.

SUMMARY OF THE INVENTION

It is an object of the invention to provide a keyswitch structure to effectively reduce the operation noise.

It is another object of the invention to provide a keyswitch structure of low noise design that can provide a buffer effect to eliminate or reduce noise generated by collision of the linking bar with the underlying keyswitch components (e.g. baseplate) during operation.

It is yet another object of the invention to provide a keyswitch structure having a buffer design that utilizes the multi-layered membrane switch to form a bridge buffer portion, so as to effectively reduce noise without increasing the material cost.

In an embodiment, the invention provides a keyswitch structure including a baseplate, a keycap disposed over the baseplate and configured to be movable relative to the baseplate, a membrane switch disposed between the keycap and the baseplate and configured to have a first buffer portion with two first open edges opposite to each other, and a first linking bar connected to the keycap and disposed between the keycap and the membrane switch, the first linking bar having a first long side and a first short side connected to each other, wherein when the keycap moves relative to the baseplate, the first buffer portion provides buffer to the first short side.

In another embodiment, the invention provides a keyswitch structure including a baseplate, a keycap disposed over the baseplate and configured to be movable relative to the baseplate, a membrane switch disposed between the keycap and the baseplate and configured to have a second buffer portion with two second open edges opposite to each other, and a first linking bar connected to the keycap and disposed between the keycap and the membrane switch, the first linking bar having a first long side and a first short side connected to each other, wherein when the keycap moves relative to the baseplate, the second buffer portion provides buffer to an end section of the first long side.

In an embodiment, the first linking bar is a planar frame body. When no pressing force is applied to the keycap, the planar frame body is substantially parallel to the baseplate.

In an embodiment, the baseplate has an inner plate hole located under the first buffer portion.

In an embodiment, the membrane switch has two first film holes, and the first buffer portion is located between the two first film holes.

In an embodiment, the baseplate has an inner plate hole located under the first buffer portion, and the inner plate hole communicates with the two first film holes.

In an embodiment, the membrane switch further has a second buffer portion with two second open edges opposite to each other. When the keycap moves relative to the baseplate, the second buffer portion provides buffer to an end section of the first long side.

In an embodiment, the baseplate has an inner plate hole and two outer plate holes. The two outer plate holes are spaced apart from each other. One of the two outer plate holes is located under the second buffer portion. The inner plate hole is located under the first buffer portion and between the two outer plate holes.

In an embodiment, the baseplate has an outer plate hole located under the second buffer portion.

In an embodiment, the membrane switch has a first film hole and a second film hole, and the second buffer portion is located between the first film hole and the second film hole.

In an embodiment, the baseplate has an outer plate hole, and the outer plate hole communicates with the first film hole and the second film hole.

In an embodiment, the membrane switch further has a third buffer portion. The second film hole is located between the second buffer portion and the third buffer portion.

In an embodiment, the keyswitch structure further includes a second linking bar connected to the keycap outside the first linking bar and disposed between the keycap and the membrane switch. The second linking bar has a second long side and a second short side connected to each other. When the keycap moves relative to the baseplate, the first buffer portion provides buffer to the second short side, or the second buffer portion provides buffer to an end section of the second long side.

In an embodiment, the keycap has a plurality of connection portions including at least two outer connection portions and an inner connection portion between the at least two outer connection portions. The length of the at least two connection portions extending from the keycap is larger than the length of the inner connection portion extending from the keycap, so when the first linking bar is connected to the plurality of connection portions, the keycap has a substantially upwardly curved profile.

Compared with the prior art, the keyswitch structure of the invention utilizes the membrane switch to form a buffer portion with open edges to provide the buffer effect during the operation of keyswitch, so as to prevent or reduce the noisy sound generated by collision of the linking bar with the baseplate. Moreover, the keyswitch structure of the invention utilizes the membrane switch to form a buffer portion to effectively reduce noise without increasing the material cost.

DETAILED DESCRIPTION OF THE PREFERRED EMBODIMENT

The invention provides a keyswitch structure of low noise design. Particularly, the keyswitch structure of the invention can be a keyswitch of the computer keyboard, but not limited thereto. The keyswitch structure of the invention can be any suitable keyswitch structure having the linking bar connected to the keycap, such as larger-sized key of the keyboard, but not limited thereto. Hereafter, the keyswitch structure of the invention will be described in detail with reference to the drawings.

Figure 1:
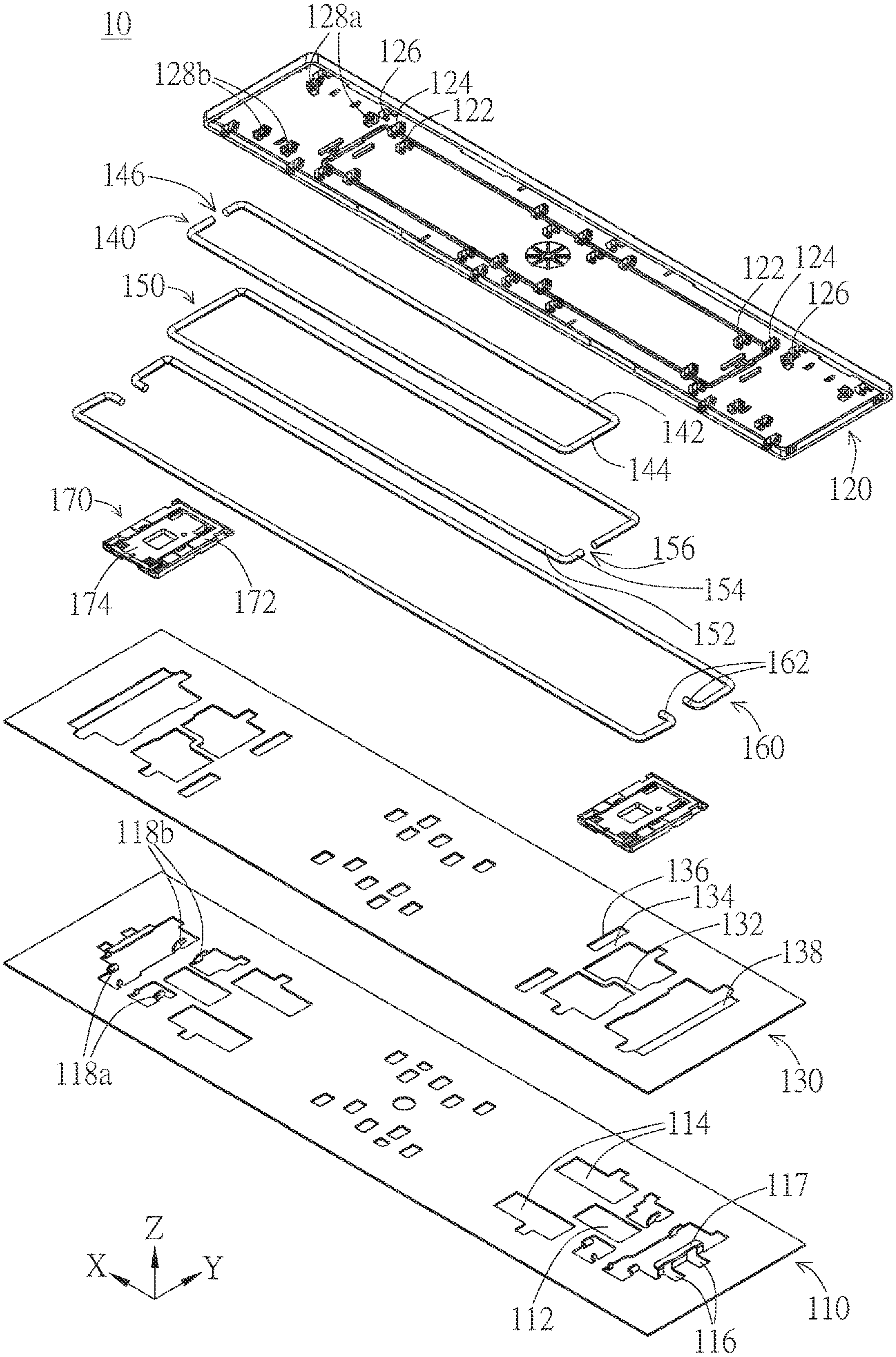
FIG. 1 is an exploded view of the keyswitch structure in an embodiment of the invention, wherein the keycap is viewed from the bottom side.
Figure 2:
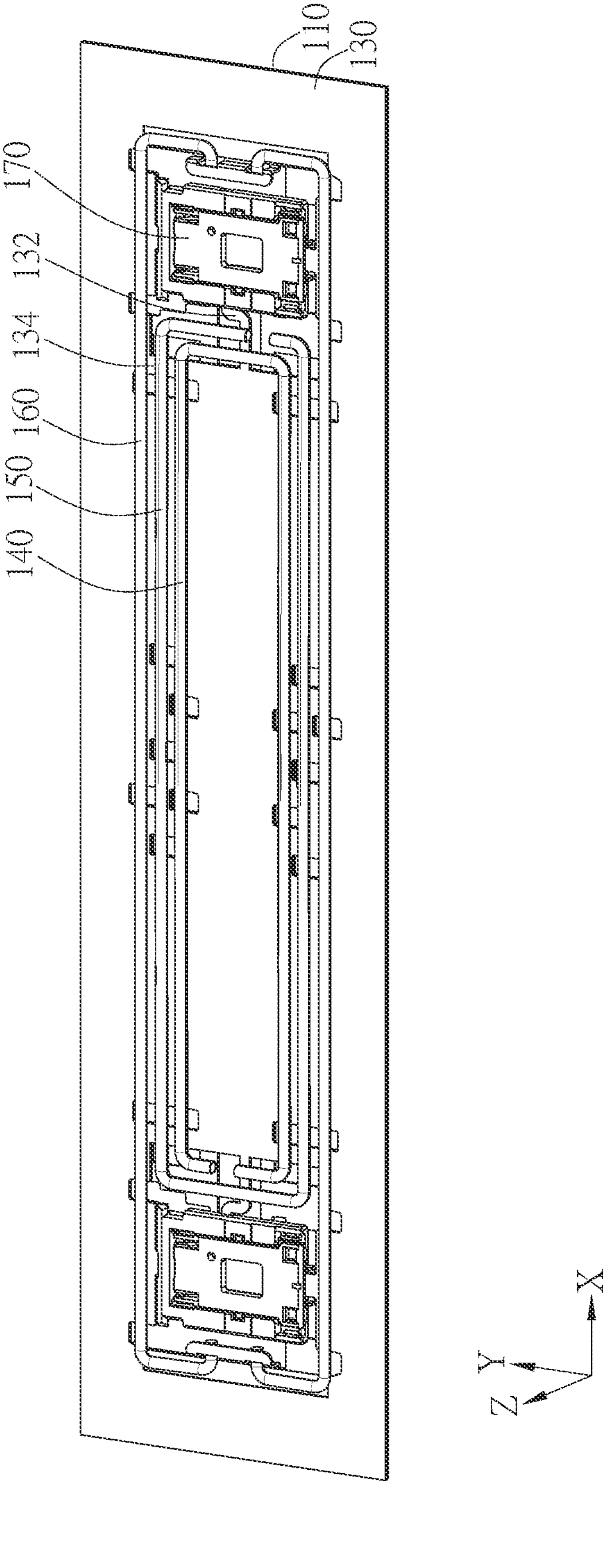
FIG. 2 is a schematic assembly view of the keyswitch structure of FIG. 1, wherein the keycap is omitted.

Referring to FIG. 1 and FIG. 2, FIG. 1 is an exploded view of the keyswitch structure in an embodiment of the invention, wherein the keycap 120 is viewed from the bottom side (e.g. shown in the bottom view), and FIG. 2 is a schematic assembly view of the keyswitch structure of FIG. 1, wherein the keycap is omitted. As shown in FIG. 1 and FIG. 2, in an embodiment, the keyswitch structure 10 includes a baseplate 110, a keycap 120, a membrane switch 130, and at least one linking bar (such as the first linking bar 140, the second linking bar 150). The keycap 120 is disposed over the baseplate 110 and configured to be movable relative to the baseplate 110. The membrane switch 130 is disposed between the keycap 120 and the baseplate 110 and configured to have at least one buffer portion (such as the first buffer portion 132, the second buffer portion 134). The buffer portion has two open edges opposite to each other (such as the first open edges 132*a* and 132*b*, the second open edges 134*a* and 134*b* shown in FIG. 3A). The linking bar is connected to the keycap 120 and disposed between the keycap 120 and the membrane switch 130. The linking bar has a long side (such as the first long side 142, the second long side 152) and a short side (such as the first short side 144, the second short side 154) connected to each other. When the keycap 120 moves relative to the baseplate 110, the at least one buffer portion provides buffer to the short side and/or the end section of the long side of the linking bar (as described later).

It is noted that according to practical application, the keyswitch structure 10 may further include other components, such as a support mechanism 170 (such as scissors-like support, a butterfly-like support, cantilever support) to support the keycap 120 to move up-down relative to the baseplate 110, a restoring unit (not shown) including an elastic restoring unit (such as rubber dome or spring) or a magnetic restoring unit (such as magnets) to provide a restoring force capable of enabling the keycap 120 to return to its original position when no pressing force is applied, a balance bar 160 configured to improve the linkage relationship of the keycap 120, etc.

Specifically, the first linking bar 140 is only connected to the keycap 120 to increase the structural strength of the keycap 120. The first linking bar 140 has the first long side 142 and the first short side 144 connected to each other. In an embodiment, the first linking bar 140 can be a planar frame body, so two first short sides 144 are respectively connected to end sections of two first long sides 142 to from a rectangular frame body. In an embodiment, the first linking bar 140 is preferably a non-closed frame bar, which has an opening (such as first opening 146) to increase the deformability of the first linking bar 140 and to improve the assembly convenience as the first linking bar 140 is to be connected to the keycap 120. For example, the first linking bar 140 preferably has a circular cross section for the bar body (i.e., the cross section of the bar body is circular) and can be formed by bending a metal line, but not limited thereto. In other embodiments, according to design requirements, the first linking bar 140 may have a bar body of oval or square shaped cross section and can be made from any suitable materials to enhance the structural strength of the keycap 120. In this embodiment, the first opening 146 of the first linking bar 140 is formed at the first short side 144, i.e., two open ends of the first linking bar 140 are two opposite ends of the interrupted first short side 144, but not limited thereto. In another embodiment, the first opening 146 of the first linking bar 140 can be formed at the portion where the first short side 144 and the first long side 142 are connected, i.e., two open ends of the first linking bar 140 is an open end of one of the first short sides 144 and an open end of the corresponding first long side 142.

As shown in the drawings, the keyswitch structure 10 can further include a second linking bar 150, and the second linking bar 150 is only connected to the keycap 120 to further enhance the structural strength of the keycap 120, but not limited thereto. According to practical applications, the keyswitch structure 10 can include one or more linking bars to provide the keycap 120 with the desired structural strength. In an embodiment, the second linking bar 150 has a structure similar to that of the first linking bar 140. Specifically, the second linking bar 150 has a second long side 152 and a second short side 154 connected to each other. The second linking bar 150 can be a planar frame body, so two second short sides 154 are respectively connected to end sections of two second long sides 152 to from a rectangular frame body. The second linking bar 150 is preferably a non-closed frame bar to increase the deformability of the second linking bar 150 and to improve the assembly convenience as the second linking bar 150 is to be connected to the keycap 120. For example, the second opening 156 of the second linking bar 150 is formed at the second short side 154 (i.e., one of the second short sides 154 is interrupted to have two opened ends) or at the portion where the second short side 154 and the second long side 152 are connected (i.e., one of the second short sides 154 and its corresponding second long side 152 have adjacent open ends). In this embodiment, the second linking bar 150 is preferably connected to the keycap 120 outside the first linking bar 140 and disposed between the keycap 120 and the membrane switch 130. In other words, the length of the second long side 152 of the second linking bar 150 is larger than that of the first long side 142 of the first linking bar 140, and the length of the second short side 154 of the second linking bar 150 is larger than that of the first short side 144 of the first linking bar 140, so the second linking bar 150 surrounds outside the first linking bar 140. Moreover, when the second linking bar 150 surrounds outside the first linking bar 140, the second opening 156 of the second linking bar 150 and the first opening 146 of the first linking bar 140 are preferably disposed at two opposite sides in the longitudinal direction (such as the X-axis direction), to balance the structural strength of the keycap 120.

Correspondingly, the keycap 120 can have a plurality of first connection portions 122 and a plurality of second connection portions 124, which are configured to connect the first linking bar 140 and the second linking bar 150, respectively. The plurality of first connection portions 122 is disposed on the lower surface of the keycap 120 corresponding to the frame contour of the first linking bar 140 to connect the corresponding bar body of the first linking bar 140 (such as the two first long sides 142). The second connection portions 124 are disposed on the lower surface of the keycap 120 corresponding to the frame contour of the second linking bar 150 to connect the corresponding bar body of the second linking bar 150 (such as the two second long sides 152). In this embodiment, the second connection portion 124 is closer to the outer edge of the keycap 120 than the first connection portion 122 is, so the second linking bar 150 is connected to the keycap 120 at the outer side of the first linking bar 140. In addition, under the configuration that the planar frame shaped first linking bar 140 and second linking bar 150 are connected to the keycap 120, when no force is applied to the keycap 120, the planar frame body of linking bar 140 or 150 is substantially parallel to the baseplate 110 (or the keycap 120).

Moreover, the keycap 120 can further have a plurality of coupling portions 128*a*, 128*b* configured to connect or couple with the support mechanism 170. For example, the coupling portions 128*a* are configured to couple with the keycap end of the first frame 172 of the support mechanism 170, and the coupling portions 128*b* are configured to couple with the keycap end of the second frame 174 of the support mechanism 170. Correspondingly, the baseplate 110 can have a plurality of connecting portions 118*a*, 118*b* configured to connect or couple with the support mechanism 170. For example, the connecting portions 118*a* are configured to couple with the baseplate end of the first frame 172, and the connecting portions 118*b* are configured to couple with the baseplate end of the second frame 174. As such, the support mechanism 170 can support the keycap 120 to move relative to the baseplate 110. In this embodiment, the support mechanism 170 takes the scissors-like support mechanism as an example, so the first frame 172 (i.e., the outer frame) is rotatably connected to the outer side of the second frame 174 (i.e., the inner frame), but not limited thereto. According to practical applications, the support mechanism 170 can have any suitable structure to support the keycap 120 to move relative to the baseplate 110.

Figure 3A:
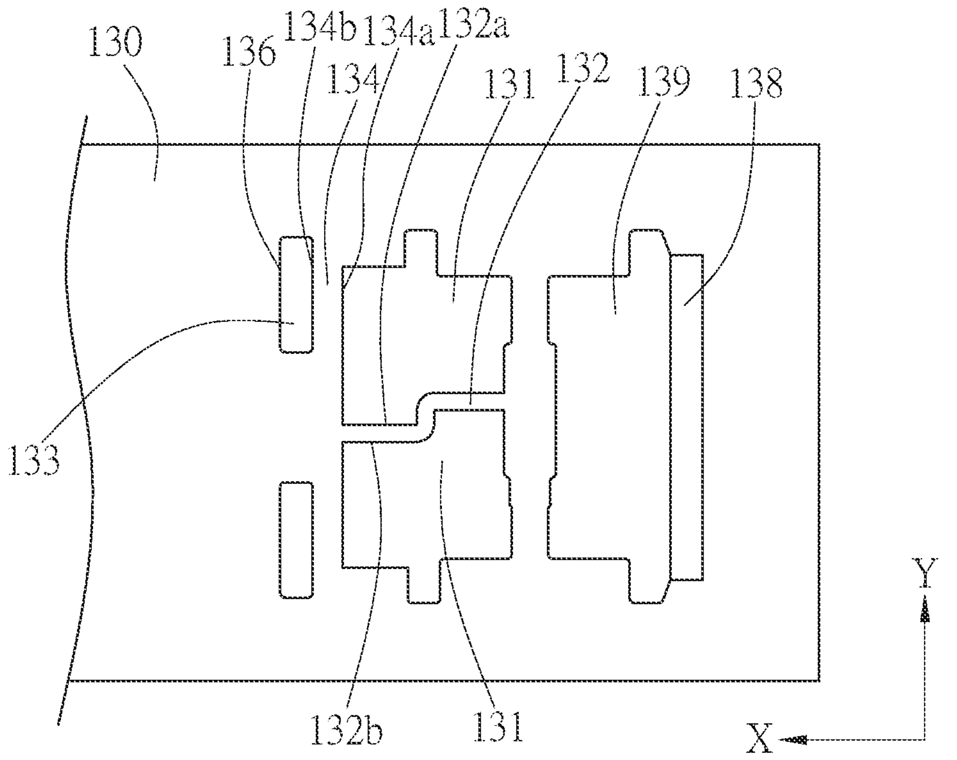
FIG. 3A is a partial plan view of the membrane switch in an embodiment of the invention.
Figure 4:
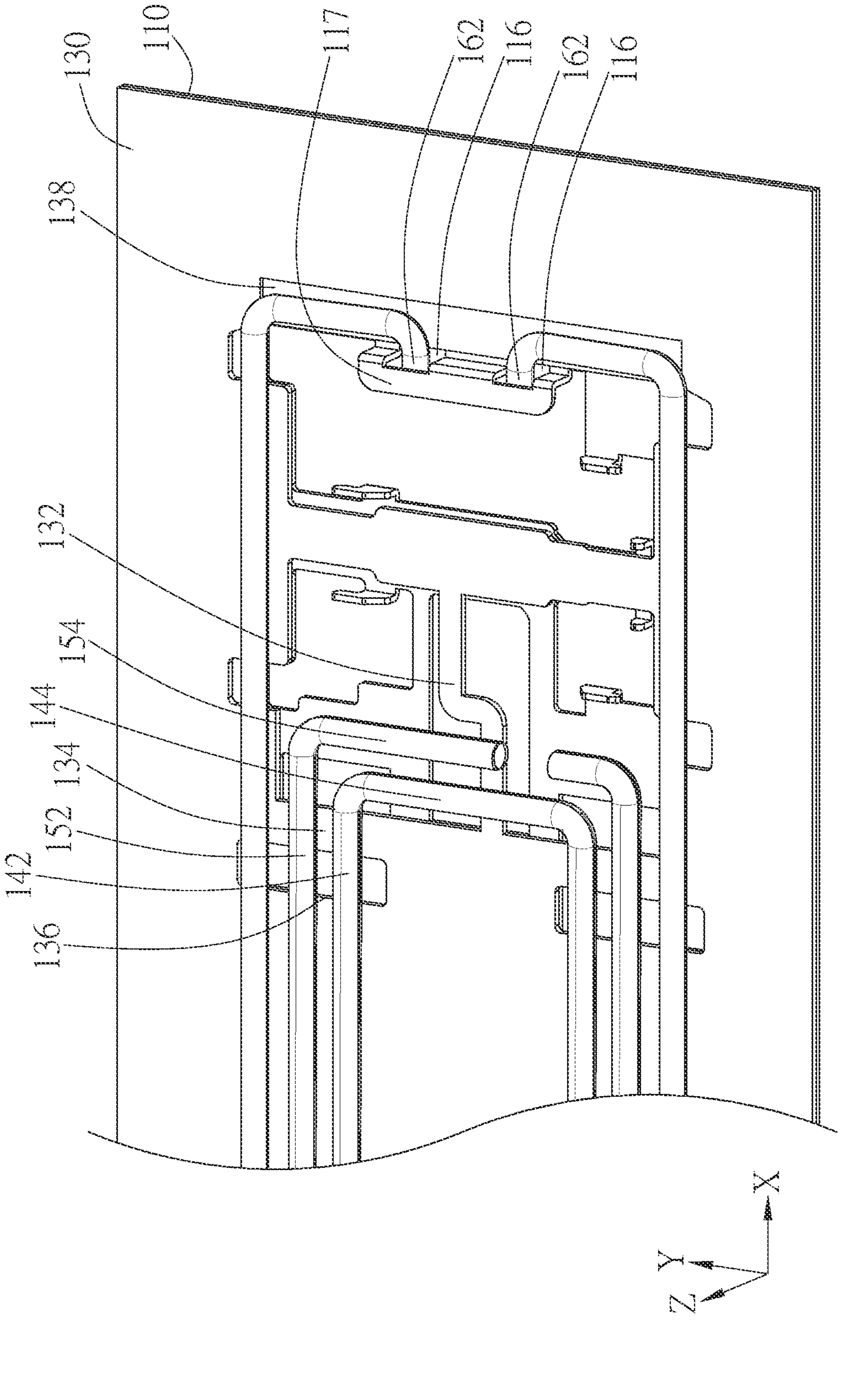
FIG. 4 is a schematic partial view showing the position of the linking bars relative to the membrane switch and the baseplate in an embodiment of the invention.

Referring to FIG. 3A and FIG. 1, FIG. 3A is a partial plan view of the membrane switch 130 in an embodiment of the invention. As shown in FIG. 3A and FIG. 1, the membrane switch 130 is located over the baseplate 110 and has a first buffer portion 132 to provide buffer to the first short side 144 of the first linking bar 140. The first buffer portion 132 has two first open edges 132*a* and 132*b*, which are located at two opposite sides of the first buffer portion 132, respectively. Specifically, the membrane switch 130 has two first film holes 131, and the first buffer portion 132 is located between the two first film holes 131. For example, the two first film holes 131 are spaced apart along the Y-axis direction, so the portion of the membrane switch 130 between the two first film holes 131 serves as the first buffer portion 132, and the two first open edges 132*a* and 132*b* are adjacent hole borders of the two first film holes 131, respectively. In this embodiment, the first buffer portion 132 preferably has a strip shape, and the extending direction of the first buffer portion 132 preferably intersects (or is perpendicular to) the extending direction of the first short side 144, so the first short side 144 can lie across on the first buffer portion 132. For example, in this embodiment, the first short side 144 extends along the Y-axis direction, and the first buffer portion 132 is preferably a strip (or a bridge portion), which extends along the X-axis direction. In other words, the two first open edges 132*a* and 132*b* extend along the X-axis direction, and the first short side 144 preferably extends across the two first open edges 132*a* and 132*b*. The buffer effect of the first buffer portion 132 is contributed from a pair of open edges (e.g. 132*a* and 132*b*), so the first buffer portion 132 has a better cushioning elasticity. Moreover, the first buffer portion 132 can have a curved-strip shape to increase the supportability and the structural strength, but not limited thereto. According to practical applications, the first buffer portion 132 can have any suitable shape, such as linear shape, zigzag shape, beaded shape, meshed shape, etc. In addition, the first buffer portion 132 preferably also provides buffer to the second short side 154 of the second linking bar 150. For example, as shown in FIG. 4, by modifying the length of the first buffer portion 132 along the X-axis direction, the first short side 144 of the first linking bar 140 and the second short side 154 of the second linking bar 150 can lie across on the first buffer portion 132, so the first buffer portion 132 can provide the buffer effect to both of the first short side 144 and the second short side 154.

As shown in FIG. 3A and FIG. 1, the membrane switch 130 can have the second buffer portion 134 to provide buffer to the end section of the first long side 142 of the first linking bar 140. The second buffer portion 134 has two second open edges 134*a* and 134*b*, which are located at two opposite sides of the second buffer portion 134, respectively. Specifically, the membrane switch 130 has the first film hole 131 and a second film hole 133, and the second buffer portion 134 is located between the first film hole 131 and the second film hole 133. For example, the first film hole 131 and the second film hole 133 are spaced apart along the X-axis direction, so the portion of the membrane switch 130 between the first film hole 131 and the second film hole 133 serves as the second buffer portion 134, and the two second open edges 134*a* and 134*b* are adjacent hole borders of the first film hole 131 and the second film hole 133, respectively. In this embodiment, the second buffer portion 134 preferably has a strip shape, and the extending direction of the second buffer portion 134 preferably intersects (or is perpendicular to) the extending direction of the first long side 142, so the first long side 142 can lie across on the second buffer portion 134. For example, in this embodiment, the first long side 142 extends along the X-axis direction, and the second buffer portion 134 is preferably a strip (or a bridge portion), which extends along the Y-axis direction. In other words, the two second open edges 134*a* and 134*b* extend along the Y-axis direction, and the end section of the first long side 142 preferably extends across the two second open edges 134*a* and 134*b*. The buffer effect of the buffer portion 134 is contributed from a pair of open edges (e.g. 134*a* and 134*b*), so the second buffer portion 134 has a better cushioning elasticity. Moreover, according to practical applications, the second buffer portion 134 can have any suitable shape, such as linear shape, zigzag shape, beaded shape, meshed shape, etc., to provide the desired cushioning elasticity. In addition, the second buffer portion 134 preferably also provides buffer to the second long side 152 of the second linking bar 150. For example, as shown in FIG. 4, by modifying the length of the second buffer portion 134 along the Y-axis direction, the first long side 142 of the first linking bar 140 and the second long side 152 of the second linking bar 150 can lie across on the second buffer portion 134, so the second buffer portion 134 can provide the buffer effect to both of the first long side 142 and the second long side 152.

It is noted that the membrane switch 130 is illustrated to have both of the first buffer portion 132 and the second buffer portion 134 in the embodiment, but not limited thereto. According to practical applications, the membrane switch 130 can have one of the first buffer portion 132 and the second buffer portion 134 to provide buffer to the short side or the end section of the long side of the linking bar.

Moreover, the membrane switch 130 can have a third buffer portion 136, and the second film hole 133 is located between the second buffer portion 134 and the third buffer portion 136. Specifically, the third buffer portion 136 further provides the buffer effect to the end section of the long side of the linking bar (e.g. the end sections of the first long side 142 and the second long side 152). The second buffer portion 134 is closer to the end section of the long side than the third buffer portion 136 is. The third buffer portion 136 has one open edge, such as the hole border of the second film hole 133 along the Y-axis direction opposite to the second open edge 134*b*, so as to allow the end section of the long side to extend beyond the open edge across the second film hole 133. The buffer effect of the third buffer portion 136 contributed from one open edge is smaller than the buffer effect of the first buffer portion 132 (or the second buffer portion 134), which is contributed from two open edges, and the supportability of the third buffer portion 136 is larger than that of the first buffer portion 132 (or the second buffer portion 134).

It is noted that the size, shape, location, number of the buffer portion (e.g. the first buffer portion 132, the second buffer portion 134, the third buffer portion 136) can be designed according to the desired cushioning elasticity and supportability. For example, the longer the buffer portion is (i.e., the longer the open edge is), or the greater the number of open edges is, the weaker the supportability is, and the better the buffer effect is. The shorter the buffer portion is (i.e., the shorter the open edge is), or the less the number of open edges is, the stronger the supportability is, and the poorer the buffer effect is. Moreover, the smaller the width of the buffer portion in the extending direction of the linking bar to be supported is (i.e., the smaller the distance between the two open edges is), the weaker the supportability is, and the better the buffer effect is. The greater the width of the buffer portion in the extending direction of the linking bar to be supported is (i.e., the greater the distance between the two open edges is), the stronger the supportability is, and the poorer the buffer effect is.

Figure 3B:
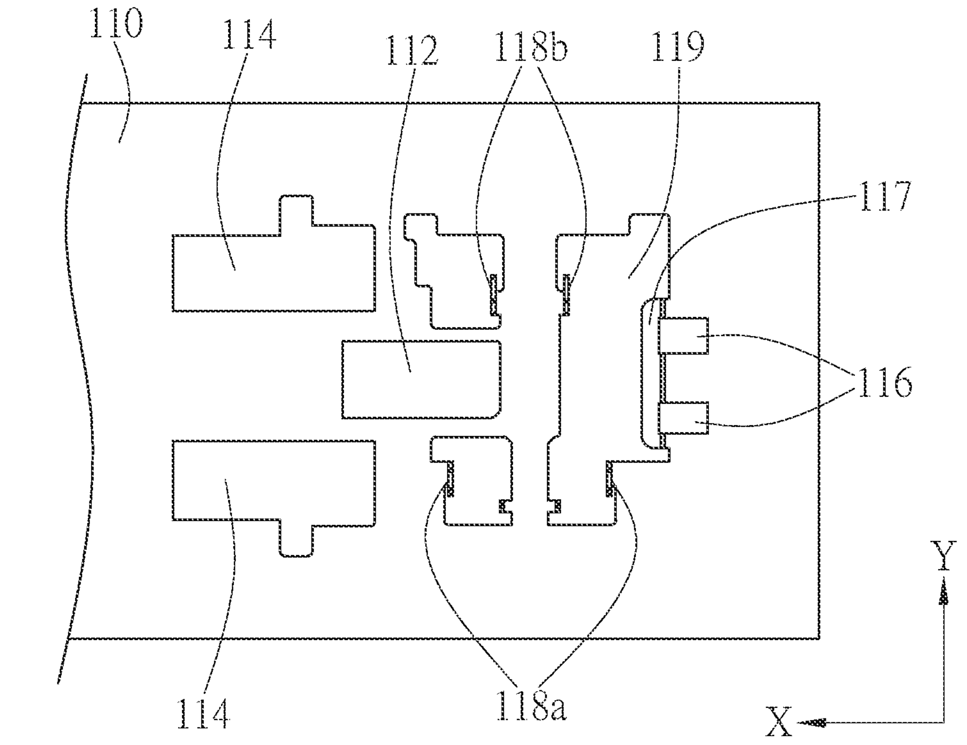
FIG. 3B is a partial plan view of the baseplate in an embodiment of the invention.
Figure 3C:
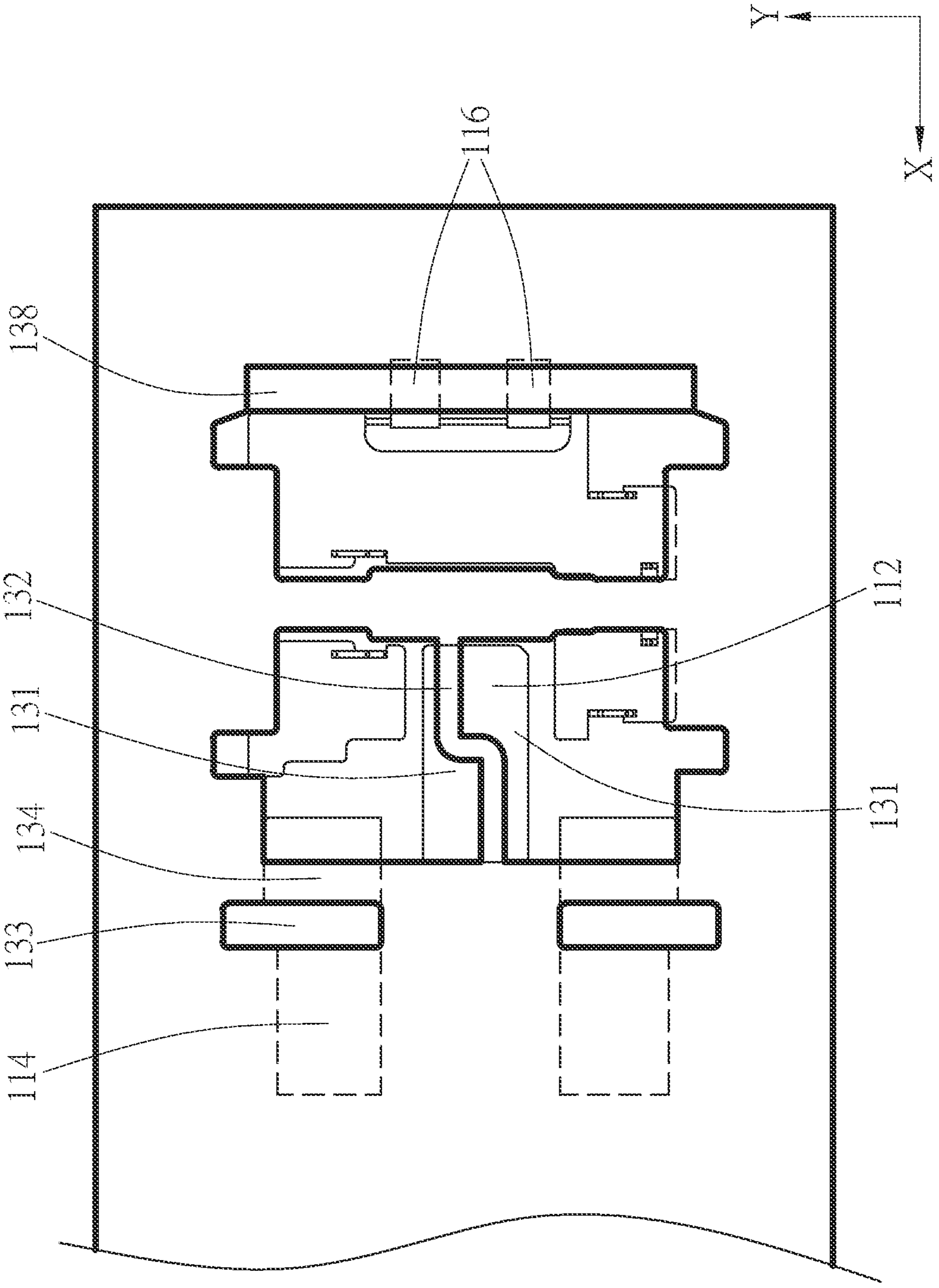
FIG. 3C is a partial plan view of the membrane switch of FIG. 3A disposed on the baseplate of FIG. 3B.

Corresponding to the design of the buffer portion, the baseplate 110 can have one or more plate holes to suspend the buffer portion, so as to increase the cushioning elasticity. Referring to FIG. 3B and FIG. 3C, FIG. 3B is a partial plan view of the baseplate 110 in an embodiment of the invention, and FIG. 3C is a partial plan view of the membrane switch 130 of FIG. 3A disposed on the baseplate 110 of FIG. 3B, wherein in FIG. 3C, the film holes of the membrane switch 130 are shown in bold lines to facilitate showing the relative positions of the film holes of the membrane switch 130 and the plate holes of the baseplate 110. As shown in FIG. 3B and FIG. 3C, the baseplate 110 has an inner plate hole 112 located under the first buffer portion 132, and the inner plate hole 112 communicates with at least one of the two first film holes 131. Herein, "the plate hole communicates with the film hole" refers to that in the stacking direction (e.g. the Z-axis direction), a virtual straight axis can pass through the plate hole and the corresponding film hole. Specifically, the vertical projection of the first buffer portion 132 on the baseplate 110 at least partially overlaps the inner plate hole 112, for example, at least partially falls within the inner plate hole 112, and preferably completely falls within the inner plate hole 112. For example, the size of the inner plate hole 112 can be so designed that the vertical projection of at least one of the first open edges 132*a*, 132*b* of the first buffer portion 132 on the baseplate 110 at least partially falls within the inner plate hole 112 (i.e., the inner plate hole 112 communicates with at least one of the two first film holes 131). Preferably, both of the vertical projections of the two first open edges 132*a*, 132*b* on the baseplate 110 at least partially fall within the inner plate hole 112 (i.e., the inner plate hole 112 communicates with both of the two first film holes 131). The larger a portion of vertical projection of the first buffer portion 132 on the baseplate 110 falling within the inner plate hole 112 is (i.e., the larger a portion of the first buffer portion 132 suspending over the inner plate hole 112 is), the better the buffer effect of the first buffer portion 132 is, and the weaker the supportability is. The less a portion of vertical projection of the first buffer portion 132 on the baseplate 110 falling within the inner plate hole 112 is (i.e., the less a portion of the first buffer portion 132 suspending over the inner plate hole 112 is), the stronger the supportability of the first buffer portion 132 is, and the poorer the buffer effect is.

Similarly, corresponding to the design of the second buffer portion 134, the baseplate 110 has an outer plate hole 114, and the outer plate hole 114 is located under the second buffer portion 134. Specifically, the baseplate 110 can have two outer plate holes 114, which are configured to correspond to two second buffer portions 134, respectively. As shown in FIG. 3B, in the case that the membrane switch 130 have both of the first buffer portion 132 and the second buffer portion 134, two outer plate holes 114 are spaced apart along the Y-axis direction, and the inner plate hole 112 is located between the two outer plate holes 114. The vertical projection of the second buffer portion 134 on the baseplate 110 at least partially falls within the outer plate hole 114, and preferably completely falls within the outer plate hole 114. In other words, the vertical projections of the two second open edges 134*a*, 134*b* of the second buffer portion 134 on the baseplate 110 fall within the outer plate hole 114, so the vertical projection of the third buffer portion 136 on the baseplate 110 also falls within the outer plate hole 114. The larger a portion of vertical projection of the second buffer portion 134 on the baseplate 110 falling within the outer plate hole 114 is (i.e., the larger a portion of the second buffer portion 134 suspending over the outer plate hole 114 is), the better the buffer effect of the second buffer portion 134 is, and the weaker the supportability is. The less a portion of vertical projection of the second buffer portion 134 on the baseplate 110 falling within the outer plate hole 114 is (i.e., the less a portion of the second buffer portion 134 suspending over the outer plate hole 114 is), the stronger the supportability of the second buffer portion 134 is, and the poorer the buffer effect is.

In this embodiment, the outer plate hole 114 communicates with both of the first film hole 131 and the second film hole 133, but not limited thereto. According to practical applications, the first film hole 131 can be further divided into a first sub-film hole and a second sub-film hole. The first sub-film hole and the second sub-film hole are arranged along the extending direction of the short side of the linking bar (e.g. the Y-axis direction), and can communicate or not communicate with each other (communicate with each other in this embodiment). When the first sub-film hole and the second sub-film hole do not communicate with each other, the inner plate hole 112 communicates with one of the first sub-film hole and the second sub-film hole of the first film hole 131, and the outer plate hole 114 communicates with the other of the first sub-film hole and the second sub-film hole of the first film hole 131. In other words, in this embodiment, the membrane switch 130 is illustrated to have a larger first film hole 131 to communicate with both of the inner plate hole 112 and the outer plate hole 114 of the baseplate 110, but not limited thereto. In other embodiments (not shown), the membrane switch 130 may have two separate (or independent) first sub-film hole and second sub-film hole, which do not communicate with each other and are configured to communicate with the inner plate hole 112 and the outer plate hole 114, respectively.

Figure 5:
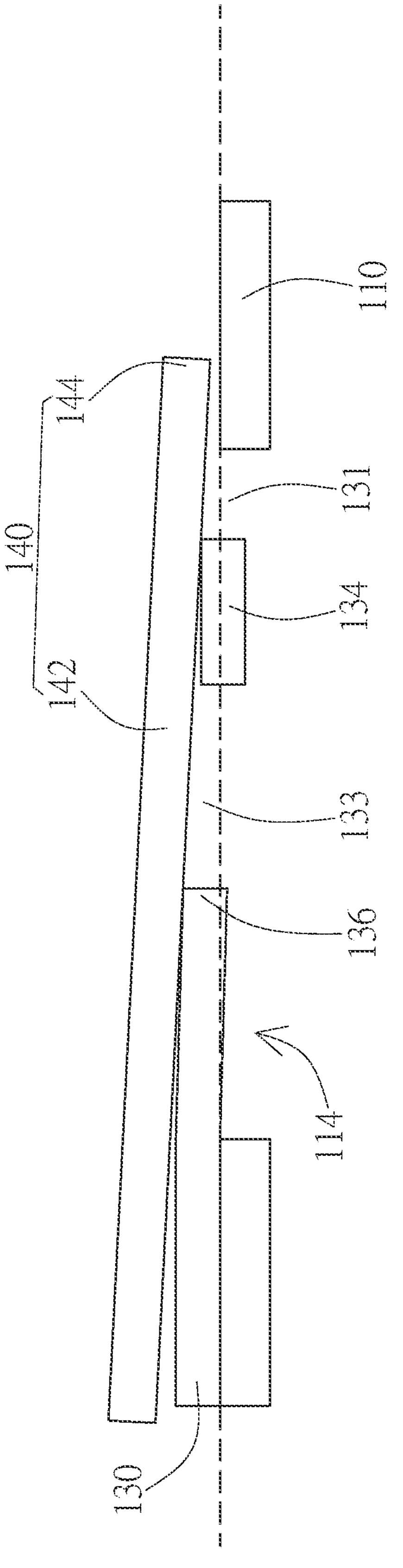
FIG. 5 is an operation view of the linking bar, the membrane switch, and the baseplate of the keyswitch structure in an embodiment of the invention.

Referring to FIG. 4 and FIG. 5, taking the second buffer portion 134 and the third buffer portion 136 as an example, the operation of the linking bar (e.g. the first linking bar 140), the membrane switch 130, and the baseplate 110 will be described. As shown in FIG. 4 and FIG. 5, when an external (pressing) force is applied to the keycap 120 to make the keycap 120 move downward relative to the baseplate 110, in the case that the external force is applied to two ends of the keycap 120 (e.g. two opposites ends in the X-axis direction) and the downward force is larger than the support force of the first linking bar 140, the first linking bar 140 will deform; for example, the end section of the long side 142 of the first linking bar 140 and the first short side 144 downwardly deform, so the end section of the first long side 142 of the first linking bar 140 and the first short side 144 get in contact with the membrane switch 130 to make the second buffer portion 134 and the third buffer portion 136 elastically downwardly deform toward the outer plate hole 114 of the baseplate 110. As such, the end section of the first long side 142 is provided with the buffer effect, and the noisy sound generated by the collision of the end section of the first long side 142 of the first linking bar 140 with the baseplate 110 can be reduced or eliminated. Though not illustrated, when the external force is applied to the keycap 120 to make the end section of the first long side 142 of the first linking bar 140 and the first short side 144 downwardly deform, the first short side 144 of the first linking bar 140 will get in contact with the first buffer portion 132 of the underlying membrane switch 130, and the first buffer portion 132 elastically downwardly deform toward the inner plate hole 112 of the baseplate 110. As such, the first short side 144 is provided with the buffer effect, and the noisy sound generated by the collision of the first short side 144 of the first linking bar 140 with the baseplate 110 can be reduced or eliminated. Moreover, the operation of the buffer portion providing the buffer effect to the second linking bar 150 is similar to the operation of the first linking bar 140 and can be referred to the above description, so will not be elaborated.

As shown in FIG. 1 to FIG. 4, the balance bar 160 of the keyswitch structure 10 is connected between the keycap 120 and the baseplate 110 to improve the linkage of the keycap 120. Therefore, when the user presses the right side of the keycap, the left side of the keycap can move downward correspondingly to prevent the keycap 120 from being in a tilt state with lower right side and higher left side. Specifically, in this embodiment, the balance bar 160 is a U-shaped bar. Two ends of the U-shaped bar have extension portions 162, which bend toward the opening of the U-shaped bar. The extension portion 162 can function as a hook to slidably couple with the baseplate 110. Corresponding to the balance bar 160, the keycap 120 has a third connection portion 126, which is configured to connect the balance bar 160. In this embodiment, multiple third connection portions 126 are disposed on the lower surface of the keycap 120 and correspond to the balance bar 160. The third connection portion 126 is closer to the outer edge of the keycap 120 than the second connection portion 124 is and configured to connect the corresponding bar body of the balance bar 160. The baseplate 110 further has a connecting portion 117, which is configured to couple with the extension portion 162 of the balance bar 160. In this embodiment, the connecting portion 117 is a coupling mechanism, which bends upward from the baseplate 110 adjacent to the plate hole 119. The connecting portion 117 has a groove 116. In this embodiment, the groove 116 extends to the surface of the baseplate 110 to form an opening corresponding to the extension portion 162 of the balance bar 160. It is noted that the membrane switch 130 has a corresponding film hole 139, which allows the connecting portion 117 to extend out from the film hole 139, so the extension portion 162 of the balance bar 160 can be slidably inserted into the groove 116. When the keycap 120 moves relative to the baseplate 110, the extension portion 162 moves in the groove 116 to enhance the balance of the keycap 120. Corresponding to the balance bar 160, the membrane switch 130 further has a buffer portion 138. The buffer portion 138 is disposed adjacent to the film hole 139 and preferably covers the opening of the groove 116, which extends on the surface of the baseplate 110. When the keycap 120 moves downward relative to the baseplate 110, the buffer portion 138 can provide the cushioning elasticity to the extension portion 162 of the balance bar 160, so as to reduce the hitting sound.

Figure 6:
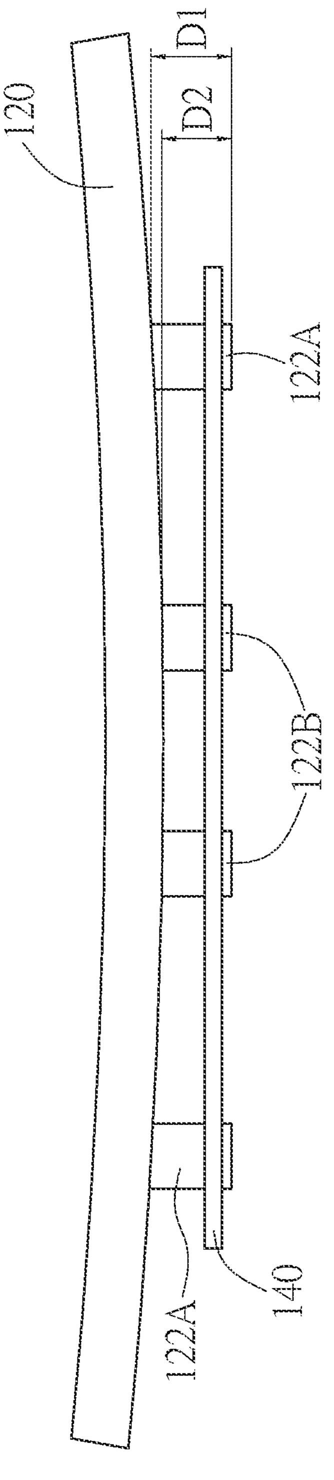
FIG. 6 is a schematic assembly view of the linking bar and the keycap of the keyswitch structure in an embodiment of the invention.

Moreover, as shown in FIG. 6, the keycap 120 has a plurality of connection portions (e.g. the first connection portions 122, the second connection portions 124). The plurality of connection portions (such as the first connection portions 122) includes at least two outer connection portions 122A and at least one inner connection portion 122B located between the at least two outer connection portions 122A. The length D1 of the at least two outer connection portions 122A extending from the keycap 120 is larger than the length D2 of the inner connection portion 122B extending from the keycap 120. As such, when the linking bar (e.g. the first linking bar 140) is connected to the plurality of connection portions (e.g. 122A, 122B) in a manner that planar frame body of the linking bar is substantially parallel to the baseplate 110 (i.e., connected at a substantially same level), the keycap 120 has a substantially upwardly curved profile. In an embodiment, the difference between the length D1 of the outer connection portion 122A and the length D2 of the inner connection portion 122B is preferably less than or equal to 0.2 mm, i.e., $0<(D1-D2)\leq 0.2$ mm, but not limited thereto. According to practical applications, the difference can be larger than 0.2 mm. Specifically, the outer connection portion 122A is disposed closer to the end section of the long side of the linking bar. Taking the plurality of first connection portions 122 coupling with the first linking bar 140 as an example, in the case that the outer connection portions 122A and the inner connection portion 122B extend from the keycap 120 by a same length (i.e., in the case that D1=D2), and the outer connection portions 122A and the inner connection portion 122B are connected to the first linking bar 140 at the same level, due to the stress generated by the first linking bar 140 and the connection portions 122A, 122B, the keycap 120 might have a substantially downwardly curved profile, resulting in a poor linkage at the corner of the keycap 120. By increasing the length D1 of the outer connection portions 122A extending from the keycap 120 (i.e., D1>D2), when the linking bar and the plurality of connection portions are connected at a substantially same level, the keycap 120 can have a substantially upwardly curved profile to promote the linkage at the outer side (or corners) of the keycap 120.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A keyswitch structure, comprising:

a baseplate;

a keycap disposed over the baseplate and configured to be movable relative to the baseplate;

a membrane switch disposed between the keycap and the baseplate and configured to have a first buffer portion with two first open edges opposite to each other; and a first linking bar only connected to the keycap and disposed between the keycap and the membrane switch, the first linking bar having a first long side and a first short side connected to each other, wherein when the keycap moves relative to the baseplate, the first buffer portion deforms in response to a pressing of the first short side.

2. The keyswitch structure of claim 1, wherein the first linking bar is a planar frame body; when no pressing force is applied to the keycap, the planar frame body is substantially parallel to the baseplate.

3. The keyswitch structure of claim 1, wherein the baseplate has an inner plate hole located under the first buffer portion.

4. The keyswitch structure of claim 1, further comprising a second linking bar connected to the keycap outside the first linking bar and disposed between the keycap and the membrane switch; the second linking bar has a second long side and a second short side connected to each other; when the keycap moves relative to the baseplate, the first buffer portion deforms in response to a pressing of the second short side.

5. The keyswitch structure of claim 1, wherein the keycap has a plurality of connection portions including at least two outer connection portions and an inner connection portion between the at least two outer connection portions; a length of the at least two outer connection portions extending from the keycap is larger than a length of the inner connection portion extending from the keycap, so when the first linking bar is connected to the plurality of connection portions, the keycap has a substantially upwardly curved profile.

6. The keyswitch structure of claim 1, wherein the membrane switch has two first film holes, and the first buffer portion is located between the two first film holes.

7. The keyswitch structure of claim 6, wherein the baseplate has an inner plate hole located under the first buffer portion, and the inner plate hole communicates with the two first film holes in a stacking direction of the membrane switch and the baseplate.

8. The keyswitch structure of claim 1, wherein the membrane switch further has a second buffer portion with two second open edges opposite to each other; when the keycap moves relative to the baseplate, the second buffer portion deforms in response to a pressing of an end section of the first long side.

9. The keyswitch structure of claim 8, further comprising a second linking bar connected to the keycap outside the first linking bar and disposed between the keycap and the membrane switch; the second linking bar has a second long side and a second short side connected to each other; when the keycap moves relative to the baseplate, the second buffer portion deforms in response to a pressing of an end section of the second long side.

10. The keyswitch structure of claim 8, wherein the baseplate has an inner plate hole and two outer plate holes; the two outer plate holes are spaced apart from each other; one of the two outer plate holes is located under the second buffer portion; the inner plate hole is located under the first buffer portion and between the two outer plate holes.

11. The keyswitch structure of claim 8, wherein the membrane switch has a first film hole and a second film hole, and the second buffer portion is located between the first film hole and the second film hole.

12. The keyswitch structure of claim 11, wherein the membrane switch further has a third buffer portion; the second film hole is located between the second buffer portion and the third buffer portion.

13. A keyswitch structure, comprising:

a baseplate;

a keycap disposed over the baseplate and configured to be movable relative to the baseplate;

a membrane switch disposed between the keycap and the baseplate and configured to have a second buffer portion with two second open edges opposite to each other; and a first linking bar connected to the keycap and disposed between the keycap and the membrane switch, the first linking bar having a first long side and a first short side connected to each other, wherein when the keycap moves relative to the baseplate, the second buffer portion deforms in response to a pressing of an end section of the first long side.

14. The keyswitch structure of claim 13, wherein the first linking bar is a planar frame body; when no pressing force is applied to the keycap, the planar frame body is substantially parallel to the baseplate.

15. The keyswitch structure of claim 13, wherein the baseplate has an outer plate hole located under the second buffer portion.

16. The keyswitch structure of claim 13, further comprising a second linking bar connected to the keycap outside the first linking bar and disposed between the keycap and the membrane switch; the second linking bar has a second long side and a second short side connected to each other; when the keycap moves relative to the baseplate, the second buffer portion deforms in response to a pressing of an end section of the second long side.

17. The keyswitch structure of claim 13, wherein the keycap has a plurality of connection portions including at least two outer connection portions and an inner connection portion between the at least two outer connection portions; a length of the at least two outer connection portions extending from the keycap is larger than a length of the inner connection portion extending from the keycap, so when the first linking bar is connected to the plurality of connection portions, the keycap has a substantially upwardly curved profile.

18. The keyswitch structure of claim 13, wherein the membrane switch has a first film hole and a second film hole, and the second buffer portion is located between the first film hole and the second film hole.

19. The keyswitch structure of claim 18, wherein the baseplate has an outer plate hole, and the outer plate hole communicates with the first film hole and the second film hole in a stacking direction of the membrane switch and the baseplate.

20. The keyswitch structure of claim 18, wherein the membrane switch further has a third buffer portion; the second film hole is located between the second buffer portion and the third buffer portion.

* * * * *